J. S. Ives,
Making Combs.
Nº 1,811.  Patented Oct. 8, 1840.
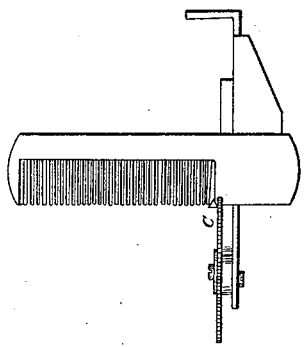
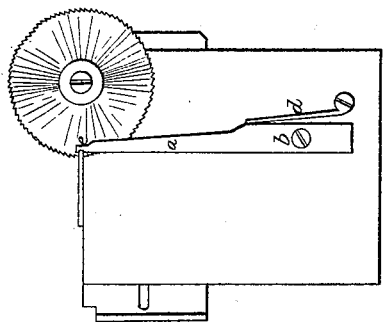

UNITED STATES PATENT OFFICE.

JOSEPH S. IVES, OF BRISTOL, CONNECTICUT.

MACHINE FOR CUTTING THE TEETH OF COMBS.

Specification of Letters Patent No. 1,811, dated October 8, 1840.

*To all whom it may concern:*

Be it known that I, JOSEPH S. IVES, of Bristol, county of Hartford, and State of Connecticut, have invented a new Improvement in Machines for Cutting Metallic Combs, of which the following is a full and exact description.

In sawing the teeth of metallic combs in the usual manner, a difficulty exists of the following nature, viz: After the saw has passed once into the solid plate of metal the length of the teeth of the comb, it is withdrawn and the plate moved endwise and adjusted for sawing another tooth, the next, and each succeeding tooth in the progress of being separated from the solid plate, being unsupported, turn from the saw and become bent.

The nature of my invention consists in an apparatus to prevent this effect, by a support to the teeth as they are successively sawed or separated from the solid plate of metal.

To enable others skilled in the art to make and use my invention, I will proceed to describe its construction and operation.

The saw and other parts of the machine may be of the usual construction for the same purpose. I apply a stud $a$ (see accompanying drawing which is intended to be a part of this specification) suspended upon a center, $b$, and borne up by a spring $d$. The upper end $e$, of this stud is formed wedge-like and is designed to enter successively into the groove next to the one which the saw is in the process of cutting, which has the effect to keep the tooth as it is separated from the plate of metal, constantly in close contact with the side of the saw, and thus prevent its being bent outward by the action of the saw.

What I claim as my invention, and desire to secure by Letters Patent, is—

The pressing the tooth while cutting against the side of the saw in the manner and for the purpose herein above described by which means I am enabled to cut the teeth very thin, and cut them straight.

JOSEPH S. IVES.

Witnesses:
CHARLES G. IVES,
MARY S. BRISTOL.